(12) United States Patent
Closser et al.

(10) Patent No.: US 12,467,135 B2
(45) Date of Patent: Nov. 11, 2025

(54) RESISTIVE COATING FOR A CAPILLARY

(71) Applicant: AGILENT TECHNOLOGIES, INC., Santa Clara, CA (US)

(72) Inventors: Richard G. Closser, Mountain View, CA (US); Elizabeth Carr, Mountain View, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 258 days.

(21) Appl. No.: 18/025,166

(22) PCT Filed: Sep. 29, 2021

(86) PCT No.: PCT/US2021/052605
§ 371 (c)(1),
(2) Date: Mar. 7, 2023

(87) PCT Pub. No.: WO2022/093468
PCT Pub. Date: May 5, 2022

(65) Prior Publication Data
US 2023/0313366 A1 Oct. 5, 2023

Related U.S. Application Data

(63) Continuation of application No. PCT/US2021/056833, filed on Oct. 27, 2021.
(Continued)

(51) Int. Cl.
*C23C 16/40* (2006.01)
*C09D 1/00* (2006.01)
(Continued)

(52) U.S. Cl.
CPC .............. *C23C 16/403* (2013.01); *C09D 1/00* (2013.01); *C23C 16/045* (2013.01);
(Continued)

(58) Field of Classification Search
None
See application file for complete search history.

(56) References Cited

U.S. PATENT DOCUMENTS

| 6,716,693 B1 | 4/2004 | Chan et al. | |
| 7,547,891 B2 * | 6/2009 | Mordehai | H01J 49/0095 250/281 |

(Continued)

FOREIGN PATENT DOCUMENTS

| CN | 106680407 A | 5/2017 |
| EP | 3591687 A1 | 1/2020 |

(Continued)

OTHER PUBLICATIONS

"The extended European search report" for EP Application No. 21887432.9, mailed Sep. 6, 2024, 11 pages.
(Continued)

*Primary Examiner* — James C Yager
(74) *Attorney, Agent, or Firm* — Mannava & Kang, P.C.

(57) ABSTRACT

A coated capillary tube having a tunable resistance in an ion transfer device, including an inlet end in communication with an atmospheric-pressure ion source, an outlet end in communication with a vacuum region of a mass spectrometer, a body elongated along an axis from the inlet end to the outlet end, and an inside surface defining a bore having an inner diameter is disclosed. The coated capillary tube also includes a resistive coating on the inside surface of the capillary tube, in which the resistive coating includes at least one layer comprising oxides or nitrides of a metal and discrete metal particles of a different metal embedded therein.

20 Claims, 4 Drawing Sheets

Related U.S. Application Data

(60) Provisional application No. 63/107,512, filed on Oct. 30, 2020.

(51) Int. Cl.
  *C23C 16/04* (2006.01)
  *C23C 16/455* (2006.01)
  *C23C 16/56* (2006.01)
  *H01J 49/04* (2006.01)

(52) U.S. Cl.
  CPC .. *C23C 16/45529* (2013.01); *C23C 16/45555* (2013.01); *C23C 16/56* (2013.01); *H01J 49/0404* (2013.01)

(56) References Cited

U.S. PATENT DOCUMENTS

| | | |
|---|---|---|
| 8,227,965 B2 | 7/2012 | Sullivan et al. |
| 8,237,129 B2 | 8/2012 | Sullivan et al. |
| 8,969,823 B2 | 3/2015 | Elam et al. |
| 9,064,676 B2 | 6/2015 | Sullivan et al. |
| 9,236,232 B2 † | 1/2016 | Hansen |
| 10,546,738 B1 | 1/2020 | Wang et al. |
| 10,761,069 B2 | 9/2020 | Guzzonato et al. |
| 2006/0071162 A1 | 4/2006 | Crawford et al. |
| 2013/0280546 A1 † | 10/2013 | Elam |
| 2013/0334118 A1 | 12/2013 | Reinhardt |
| 2013/0335190 A1 | 12/2013 | Elam et al. |
| 2015/0122365 A1 | 5/2015 | Carr et al. |
| 2020/0203157 A1 | 6/2020 | Su |

FOREIGN PATENT DOCUMENTS

| | | |
|---|---|---|
| JP | 2007507721 A | 3/2007 |
| WO | 0060341 A1 | 10/2000 |

OTHER PUBLICATIONS

International Search Report and Written Opinion for PCT Application No. PCT/US2021/052605, mailed Jan. 19, 2022, 9 pages.
International Search Report and Written Opinion for PCT Application No. PCT/US2021/056833, mailed Feb. 11, 2022, 12 pages.
European Patent Office, "Communication pursuant to Rule 114(2) EPC regarding EP Application No. 21887432.9", 1 dated Sep. 17, 2025, 9 pages.

\* cited by examiner
† cited by third party

RESISTIVE COATING FOR A CAPILLARY

RELATED APPLICATION

The present application claims the benefit of priority of U.S. Provisional Patent Application No. 63/107,512, filed Oct. 30, 2020; WIPO Application No. PCT/US2021/052605, filed Sep. 29, 2021; and WIPO Application No. PCT/US2021/056833 filed Oct. 27, 2021; the disclosures of which are hereby incorporated in their entirety by reference herein.

FIELD OF THE INVENTION

The present disclosure relates generally to a capillary tube used in an ion transfer device that may be used to transfer ions from an atmospheric-pressure ion source into a vacuum region of a mass spectrometer (MS).

BACKGROUND

The ion transfer device contains a capillary tube with a composition that allows for fast polarity switching when MS applications require a change in voltage across this capillary tube. Metal capillaries can achieve the fast polarity switching but can readily degrade when exposed to the high temperatures and solvents used in Liquid Chromatography/Mass Spectrum (LC/MS) applications. Moreover, metal capillaries cannot maintain a voltage drop due to their conductivity. More resistive, lead containing glass capillaries have proved useful in an ion transfer device. However, leaded glass is inherently unstable and can show electrical resistance drift over time. It is also expensive, difficult to obtain and potentially toxic to process.

SUMMARY OF THE INVENTION

In an aspect, there is disclosed a coated capillary tube having a tunable resistance coating in an ion transfer device, comprising: an inlet end in communication with an atmospheric-pressure ion source, an outlet end in communication with a vacuum region of a mass spectrometer, a body elongated along an axis from the inlet end to the outlet end, and an inside surface defining a plurality of inner bores having an inner diameter; and a resistive coating on the inside surface of the capillary tube, the resistive coating including: at least one layer including oxides or nitrides of a metal and discrete metal particles of a different metal or metal oxide embedded therein.

In another aspect, there is disclosed a resistive coating on an inner surface of a capillary tube comprising: a base layer comprising $TiO_2$, $Y_2O_3$, $Ta_2O_5$, $HfO_2$, $Al_2O_3$, $ZrO_2$, AlN, ZrN, or a combination thereof; a plurality of discrete metal particles in a layer comprising Ru, W, Mo, Pt, or a combination thereof; a plurality of layers of a cover layer comprising $TiO_2$, $Y_2O_3$, $Ta_2O_5$, $HfO_2$, $Al_2O_3$, $ZrO_2$, AlN, ZrN, or a combination thereof; wherein the plurality of layers of discrete metal particles and the plurality of layers of a cover layer are alternating to create a mixture of discrete metal particles embedded in the cover layer.

In another aspect, there is disclosed a method of coating an inside surface of a capillary tube in an ion transfer device, comprising steps of: (a) performing atomic layer deposition (ALD) of metal oxides or metals onto or within the capillary tube comprising: (A) introducing one or both aluminum or zirconium precursors following by purging with an inert gas; (B) pulsing a first oxygen containing compound to react with the aluminum or the zirconium precursors, followed by purging with an inert gas, to create a metal oxide layer; (C) optionally conducting a first number of sub-cycles of deposition of the metal oxide layer to produce a plurality of metal oxide layers; (D) introducing ruthenium, tungsten, molybdenum, platinum, or a combination precursor followed by purging with an inert gas; (E) pulsing a second oxygen containing compound followed by purging with an inert gas, thereby performing ALD of a second layer at a second deposition temperature; (F) optionally conducting a second number of sub-cycles of deposition of the second layer to produce one of a second plurality of layers; and (G) repeating step (A) through (F) for a plurality of cycles to produce a resistive coating on the tube; and (b) removing the coating from outside surface of the capillary tube.

Further, there is also disclosed a method of transferring ions using a coated capillary tube comprising: connecting an inlet of the coated capillary tube to an ion source at atmospheric pressure; and connecting an outlet of the coated capillary tube to a vacuum region of a mass spectrometer; wherein the coated capillary tube comprises at least one layer comprising oxides or nitrides of a metal and discrete metal particles of a different metal embedded therein.

DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

The same part numbers designate the same or similar parts throughout the figures.

DESCRIPTION

Figure 1:
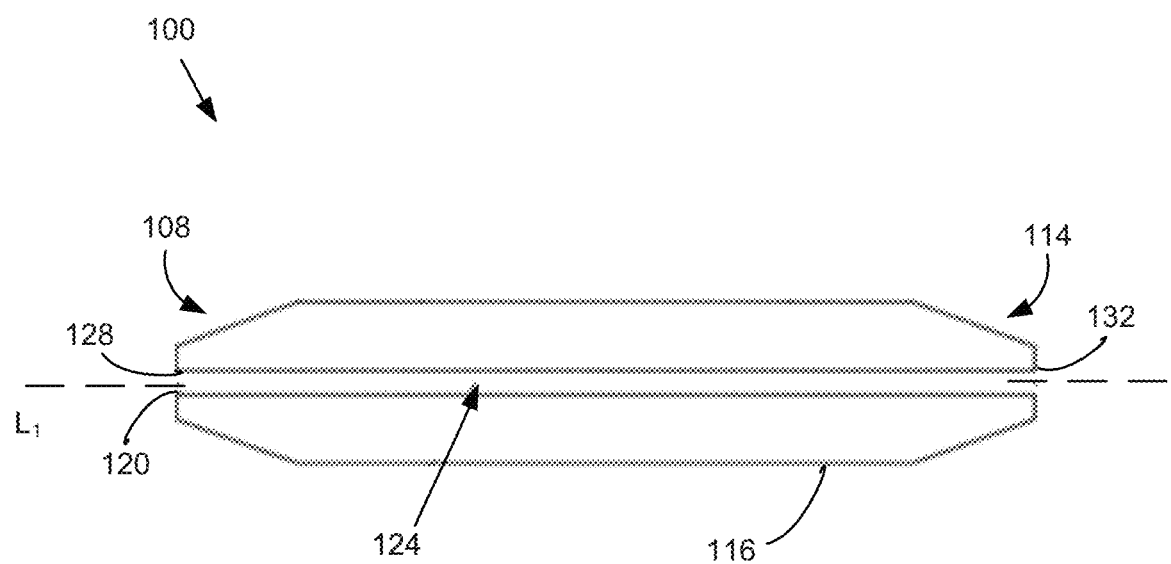
FIG. 1 is a schematic cross-sectional side (lengthwise) view of an ion transfer device according to an aspect of the present disclosure.

As used herein, the term "ion transfer device" refers to a coated capillary tube having a tunable resistance, including an inlet end in communication with an atmospheric-pressure ion source; an outlet end in communication with a vacuum region of a mass spectrometer; a body elongated along an axis from the inlet end to the outlet end; and an inside surface defining a plurality of bores having an inner diameter. The coated capillary tube also includes a resistive coating on the inside surface of the capillary tube. The resistive coating can include at least one layer comprising oxides or nitrides of a metal and discrete metal particles of a different metal or metal oxide embedded therein. The ions can flow through the center of the bore and not hit the side walls. Moreover, the ion transfer device, as defined herein, does not amplify the ions.

As used herein, the term "atmospheric pressure" is not limited to exactly 760 Torr, or one atmosphere (1 atm), but instead encompasses a range around 760 Torr (e.g., 100 to 900 Torr).

As used herein, the term "vacuum" or "vacuum pressure" refers to a pressure that is at least an order of magnitude less than atmospheric pressure. For example, vacuum pressure encompasses sub-atmospheric pressures down to 10-9 Torr or lower.

As used herein, the term "coating" and "coated" refer to a separate and distinct layer of material from an underlying material. A coated material exhibits an identifiable boundary, e.g., diffuse or abrupt, between the coating material and the underlying material, e.g., support material, underlying coating, etc.

As used herein, the term "precursor" refers to molecules in the gas phase that include one or more of the elements desired to be in the coating. These precursors can undergo a chemical or physical change, such that the desired elements can be deposited on the surface and can be incorporated in the coating. The precursors can be inorganic, organometallic, or organic compounds. For example, the precursors can include metal-based materials that would result in a resistive coating on the surface wherein the resistive coating includes at least one layer comprising oxides or nitrides of a metal and discrete metal particles of a different metal embedded therein. The precursors can also include, for example, $H_2O$ for producing oxides, or $NH_3$ for producing nitrides. The precursors can also include, for example, trimethylaluminum, to provide means for including a metal, in this example, aluminum, into the coating; or platinum(II) acetylacetonate to incorporate platinum into the coating. Trimethylaluminum and other precursors can also be introduced during or after a coating process with intention to etch or modify the coating but without incorporation into the coating. Other examples include organic precursors that can result in polymeric materials as a protective coating on the surface. Many other possibilities for precursors exist and are evident in the literature, and precursors yet to be developed could also fall under the scope of embodiments of the present disclosure.

As used herein, the term "atomic layer deposition" or "ALD" refers to a type of thermal chemical vapor deposition in which layer-by-layer control of deposition of thin films is achieved using sequential, self-limiting surface reactions. The two half-reactions associated with a two-precursor deposition are separated in time, and the reactor is purged with inert gas or evacuated to ensure physical separation of the precursors. Each half-reaction is self-limiting, leading to highly conformal and controllable deposition on structures of complex topography and high aspect ratio.

As appreciated by persons skilled in the art, different types of vacuum pumps can be utilized to bring an enclosed space, or vacuum chamber, down to different ranges of low pressure. For example, a "roughing" pump (or "backing" pump) may be utilized to pump a vacuum chamber down to a "rough" vacuum level of, for example, down to about 10-3 Torr. Roughing pumps typically have a predominantly mechanical design, examples of which include, but are not limited to, scroll pumps, rotary vane pumps, diaphragm pumps, Roots blower (positive displacement lobe) pumps, etc. High-vacuum pumps are utilized to achieve higher levels of vacuum (lower pressures), for example, down to 10-9 Torr or lower. Examples of high-vacuum pumps include, but are not limited to, diffusion pumps, turbomolecular pumps and sputter-ion pumps. A roughing pump may be utilized in conjunction with a high-vacuum pump as a first stage of vacuum pump-down and/or to isolate a high-vacuum pump from rough-vacuum or higher-pressure environments.

Figure 2:
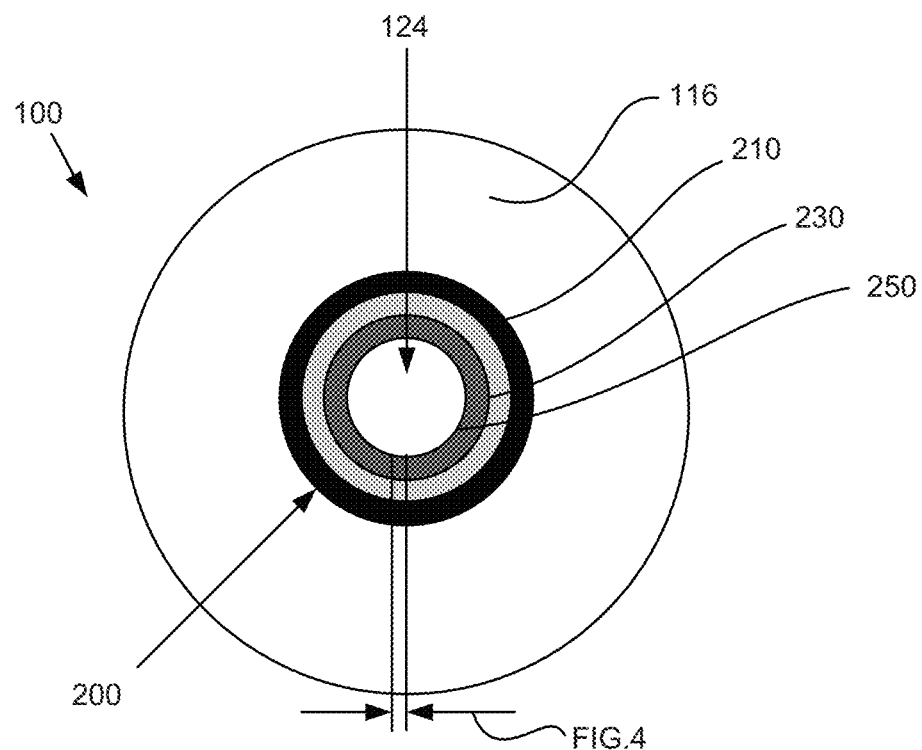
FIG. 2 is a schematic cross-sectional transverse view of the ion transfer device illustrated in FIG. 1, in which the cross-section is taken through a transverse plane orthogonal to the device axis.

It is imperative to have a capillary with improved ion transfer capabilities while maintaining the desired resistivity when exposed to high temperatures and corrosive environments. To this end, FIG. 1 is a schematic cross-sectional side (lengthwise) view of a capillary tube 100 that can be used in an ion transfer device, according to an example. Generally, the capillary tube 100 has a length along a longitudinal, or device, axis L1. FIG. 2 is a schematic cross-sectional transverse view of the capillary tube 100 illustrated in FIG. 1, in which the cross-section is taken through a transverse plane orthogonal to the device axis L1, i.e., into the drawing sheet of FIG. 1.

The capillary tube 100 includes an inlet end 108, an outlet end 114, and a body 116 elongated along the device axis L1 from the inlet end 108 to the outlet end 114. The body 116 has an inside surface or wall 120 defining a tube bore 124. The bore 124 includes a bore inlet 128 and a bore outlet 132, and extends from the bore inlet 128 to the bore outlet 132 along the device axis L1. The bore 124 provides a path or conduit for ions and gas to flow from the inlet end 108 to the outlet end 114. One or both axial ends of the tube 100 may be tapered, as illustrated in FIG. 1.

In an embodiment (and as illustrated), an inside diameter of the bore 124 is constant along the length of the body 116, such that the inside diameter of the bore inlet 128 is the same as the inside diameter of the bore outlet 132. In other embodiments, the inside diameter of the bore 124 may vary, i.e., may be increased or reduced along the entire length of the body 116 (or in one or more axial sections of the body 116), for example, in a gradual or step-wise manner in the direction of ion travel (i.e., toward the outlet end 114). Varying the inside diameter of the bore 124 may be done to achieve a desired effect on the mechanics of the ion flow and/or fluid flow into, through, or from the bore 124.

Generally, the capillary tube 100 may be composed of any material suitable for use in transferring ions and gas in an associated instrument, such as in an interface between an ion source and a lower pressure region of a mass spectrometer, or in an ion mobility drift cell.

In one non-exclusive example, the capillary tube 100 has a length (L) (from inlet end 108 to outlet end 114) in a range of from about 30 mm to about 300 mm, for example, from about 75 mm to about 200 mm, such as about 180 mm, and an outside diameter in a range of from about 3 mm to about 12 mm, for example, from about 5 mm to about 10 mm. In one non-exclusive example, a gas conduit defined by the bore 124 has an inside diameter (ID) in a range from about 0.1 mm to about 2.0 mm, such as about 0.6 mm. In such examples, the capillary tube 100 may be characterized as being a capillary or having a capillary inner bore. In one example the aspect ratio of L/DI can be about 75 or more, such as greater than 80 or greater than 100, such as 150, 200, or 300.

As shown in FIG. 2, the capillary tube 100 may further include a tunable resistive coating 200 deposited on the body 116. The tunable resistive coating 200 may include at least one layer, such as a base layer 210 (e.g., a film, coating, lining, etc.) disposed on the inside surface 120, an intermediate layer, and/or a final layer. The at least one layer can include oxides or nitrides of a metal and discrete metal particles of a different metal or metal oxide embedded therein.

In an aspect, the base layer 210 may be any suitable material, such as, but not limited to, an inorganic compound or oxides, nitrides or oxynitrides thereof. For example, the base layer 210 may comprise a material selected from Si-based, Ti-based, Zr-based, Al-based, Y-based, Ta-based, and Hf-based inorganic compounds (e.g., oxides, nitrides or oxynitrides), or combinations thereof. In certain examples, at least one layer may include a material selected from $SiO_2$, SiC, $Si_3N_4$, $SiO_xC_y$, $SiO_xN_y$, $SiC_xH_y$. In another aspect, the at least one layer can be an oxide of a metal including a metal oxide chosen from $TiO_2$, $ZrO_2$, $Al_2O_3$, $Y_2O_3$, $Ta_2O_5$, $HfO_2$, or combinations thereof, in which x and y are integers. In an example, the base layer 210 may have a thickness (i.e., defined in a radial direction orthogonal to the device axis L) in a range of from about 0.5 nm to about 1 μm, such as from about 1 nm to about 800 nm, such as from about 10 nm to about 500. In an embodiment, the base layer 210 may extend along the entire length of the bore 124 from the bore inlet 128 to the bore outlet 132.

As discussed above, the resistive coating 200 can also include discrete metal particles of a different metal or metal oxide embedded therein. In another aspect, the resistive coating 200 can also include a metal or metal oxide such as platinum (Pt), ruthenium (Ru), tungsten (W), and molybdenum (Mo), or a combination thereof.

In another example, when the base layer 210 is $Al_2O_3$ or AlN, then the capillary tube 100 can further include at least one intermediate layer 230 deposited on the base layer 210, as shown in FIG. 2. In an example, the at least one intermediate layer 230 may include discrete metal particles 232. Some examples of the discrete metal particles 232 include platinum (Pt), ruthenium (Ru), tungsten (W), and molybdenum (Mo). In an example, these metals are chemically inert. That is, the discrete metal particles 232 are unreactive with chemical species (compounds or elements) that flow through the bore 124 in the use of the capillary tube 100. In an example, the diameter of the discrete metal particles 232 can be from about 0.1 nm to about 50 nm, such as from about 1 nm to about 10 nm, for example, from about 1.5 nm to about 3 nm.

Figure 3A:
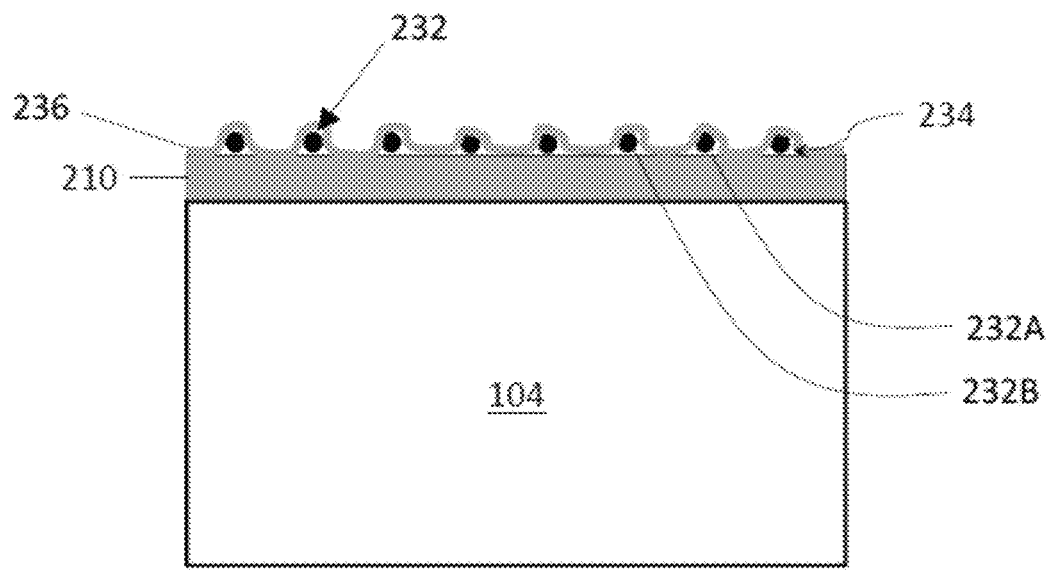
FIGS. 3A and 3B illustrate a method of developing the resistive layer for the ion transfer device.
Figure 3B:
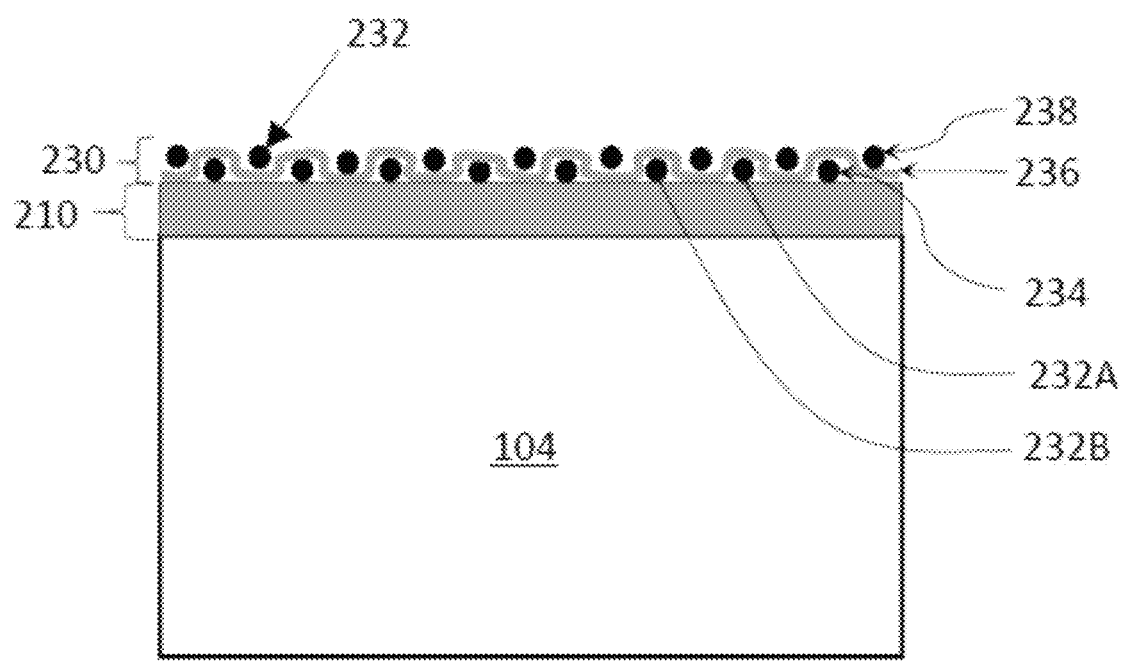

In an example, as shown in FIGS. 3A and 3B, the discrete metal particles 232 can be deposited on the base layer 210 by one or many process cycles, described in detail below. For example, discrete metal particles 232A can be deposited by a first process cycle and discrete metal particles 232B can be deposited by a second process cycle. The discrete metal particles 232A and 232B may or may not be evenly distributed.

In an example, the at least one intermediate layer 230 also includes a covering layer 236, as shown in FIGS. 3A and 3B. The covering layer 236 covers each of the discrete metal particles 232 and can also be deposited between each of the discrete metal particles 232. In one example, the covering layer 236 may be made of the same material as the base layer 210. For example, the covering layer 236 may be made of $Al_2O_3$, AlN, $ZrO_2$, or ZrN. The thickness of the covering layer 236 may allow a charge from discrete metal particles 232 to transfer from one to another. For example, the covering layer 236 may have a thickness of from about 0.1 nm to 500 nm, such as from about 1 nm to about 50 nm, such as from about 1.5 nm to about 5 nm, for example from about 1.5 nm to about 3 nm.

Figure 4:
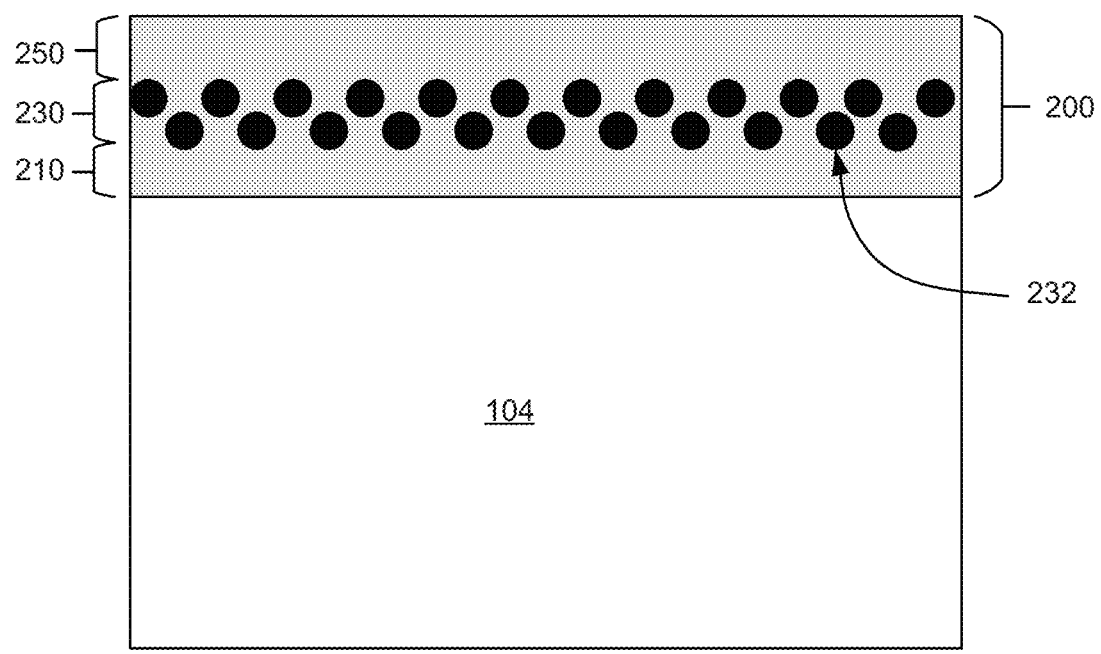
FIG. 4 is an explosive view of a portion of the ion transfer device illustrated in FIG. 2.

The intermediate layer 230 may include a plurality of alternating discrete metal particles 232 layer and a plurality of covering layers 236. In an example, the intermediate layer 230 can include as few as one layer of discrete metal particles 232 prior to applying a final layer 250 to as many as 100 or more layers of alternating discrete metal particles 232 and covering layers 236, for example, the coating can include from about 25 to about 50 alternating discrete metal particles 232 and covering layer 236. For example, as shown in FIG. 3B, the intermediate layer 230 can include a first discrete metal particle layer 234, a covering layer 236, and a second discrete metal particle layer 238. In this example, a final layer 250 can be placed on top and in between the discrete metal particles 232 in the second discrete metal particle layer 238, as shown in FIG. 4 to create the desired tunable resistive coating 200. This alternating discrete metal particles 232 and covering layers 236 in the intermediate layer 230 results in the intermediate layer 230 having a mixture of discrete metal particles 232 therein, such that each metal particle is discretely placed, embedded, and surrounded by the covering layer 236. In this particular example, the covering layer 236 can include a thickness of from about 0.1 nm to about 50 nm, such as from about 1 nm to about 10 nm, for example, from about 1.5 nm to about 3 nm. In an example, the base layer 210 and the final layer 250 may be thicker or thinner than the intermediate layer 230. The final layer 250 can include a thickness that is greater than a diameter of the discrete metal particles. The base layer can include a thickness that is greater than a diameter of the discrete metal particles. In one example, the coating does not require a base layer 210 or the final layer 250. In one example, the final layer 250 can include a thickness similar to the thickness of the base layer 210. Thus, the final layer 250 can include a thickness of from about 0.5 nm to about 1 μm, such as from about 1 nm to about 800 nm, such as from about 10 nm to about 500 nm. Moreover, both the covering layer 236 and the final layer 250 may be made of the same material as the base layer 210. For example, the covering layer 236 and the final layer 250 may be made of $Al_2O_3$, AN, $ZrO_2$, or ZrN. In certain examples, the final layer 250 is not made of the same material as the base layer 210, and forms a protective coating. The protective coating may include a material selected from $SiO_2$, SiC, $Si_3N_4$, $SiO_xC_y$, $SiO_xN_y$, $SiC_xH_y$, $TiO_2$, $ZrO_2$, $Al_2O_3$, $Y_2O_3$, $Ta_2O_5$, $HfO_2$, or combinations thereof.

In one example, after the final layer 250 has been deposited on the intermediate layer 230, the tunable resistive coating 200 can go through an annealing process at a temperature of from about 200° C. to about 600° C., such as from about 300° C. to about 500° C., for example at a temperature of about 400° C. for a time of from about 1 min. to about 24 hours, such as from about 30 min. to about 10 hours. In another example, the annealing process takes place after deposition of each layer. For example, the annealing process can take place after deposition of the base layer 210, then again after deposition of the intermediate layers 230, and finally after deposition of the final layer 250. In an example, when the intermediate layers 230 include alternating layers of discrete metal particles 232 and covering layer 236, the annealing process can occur after deposition of the plurality of alternating layers have been deposited. The alternating layers of discrete metal particles 232 and covering layer 236 can create a sea of covering layer (e.g., alumina) with discrete meatal particles (e.g., Pt) imbedded within.

The resistive coating can include a base layer, a final layer, or both. The base layer, the final layer, or both can comprise oxides or nitrides of a metal. The base layer can comprise a plurality of sublayers of metal oxides, metal nitrides, or a combination thereof. The at least one layer including discrete metal particles, of the resistive coating, can comprise a plurality of sublayers including a plurality of discrete metal particles. The final layer can comprise a plurality of sublayers of metal oxides, metal nitrides, or a combination thereof. In an aspect, the at least one layer can comprise a plurality of alternating layers including a plurality of layers including discrete metal particles and a plurality of layers including oxides or nitrides of the metal Depending on its length, the tunable resistive layer 200 may partially or fully surround the gas conduit defined by the bore 124, and thus may define the actual inside diameter of the gas conduit. In an example, the tunable resistive layer 200 covers the entire length of the inside surface or wall 120 from the bore inlet 128 to the bore outlet 132.

Figure 5:
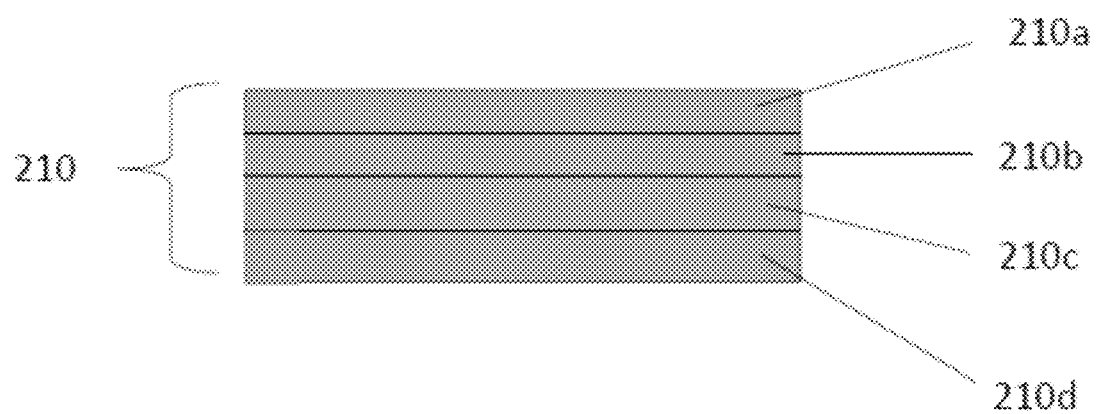
FIG. 5 is an explosive view of a base layer.

The base layer 210, the intermediate layers 230, and the final layer 250 may be fabricated or formed in the bore 124 by atomic layer deposition (ALD). ALD is a vapor phase multi-step deposition process typically performed under vacuum conditions. In the first step, a source material (precursor), such as an organometallic precursor, is vaporized from its source and dosed into the vacuum chamber containing the sample capillary, thereby adsorbing and bonding to the capillary surface 120. Some examples of aluminum containing organometallic precursors include trimethylaluminum or aluminum trichloride. This precursor is chosen such that it is self-limiting, in that, it will undergo a reaction onto the surface 120, but it will not react with itself or the surface product. As this precursor vapor is exposed over the surface 120, the surface 120 becomes saturated with a single layer of reacted precursor. The second step is a purge of excess vapors that cannot react, as well as the vapor products of the surface reaction. This purge can be done by flowing an inert gas, such as Na or Ar, into the reaction chamber while simultaneously or intermittently vacuum pumping the chamber. Once purged, the third step, like the first, is exposure of a second precursor that reacts with the first precursor, which is still bonded to the substrate surface, but the second precursor does not react with itself or the surface reaction products, thereby creating a single saturated layer of reacted precursor. Examples of the second precursor include oxygen containing compounds, such as $H_2O$, $O_2$, $O_2$ plasma, $O_3$, or alcohols. However, non-oxygen containing precursors can be used as well. The fourth step, like the second, is a purging of excess unreacted vapor and reaction by-products from the system by flowing inert gas into the system and vacuum pumping the chamber. These steps complete one ALD cycle, thereby forming one monolayer of film, though in some examples more processing steps or different precursor materials are required. In an example, each of these steps is performed in a temperature of from about 5° C. to about 500° C., for example from about 30° C. to about 350° C. Depending on the desired thickness of coating, these steps can be repeated as many times as necessary to create a plurality of sublayers to make the first layer. In an example, as shown in FIG. 5, the base layer 210 is made by depositing sublayers 210a-210d by repeating/cycling the four steps, four times. Multiple cycling of the four steps can be performed to create the intermediate layer 230 or the final layer 250.

In order to produce a working LC/MS resistive capillary, the resistance of the capillary should be within a small range that is more resistive than a conductor but less resistive than an insulator. To create a coating with this mid-range resistive quality, the ALD process may be used to deposit a plurality of discrete metal particles on the base layer 210. In an example, a plurality of metal oxide layers (such as $Al_2O_3$ layers) and a plurality of discrete metal particles 232 can be alternatingly arranged on top of and interpenetrated to each other, such that the desired small range of capillary resistance is established. A resistive capillary can therefore be made by coating a borosilicate or quartz glass capillary with alternating processes of metal oxide layers and layers of discrete metal particle layers.

As discussed above, the discrete metal particles 232 can include Pt, Ru, W, Mo, or a combination thereof. When using ALD to deposit these and similar metals onto surfaces of metal oxides, it is common for these metals to first form discrete particles as opposed to a full continuous layer. This occurs for several reasons, the most important of which are: 1) the relatively low surface energy of metal oxide surfaces compared to the high surface energies of the organometallic precursors used for metal ALD and 2) a limitation of active surface sites that allow the precursor to chemically react onto the surface. This causes a very weak interaction between the organometallic precursor and the metal oxide surface resulting in an inhibited ALD growth process that begins as small discrete particle formation. In an example, similar to depositing the metal oxide layer, to deposit the discrete metal particles on the metal oxide layer, a source of metal precursor is required. In one example, when the metal particles are Pt, then the source of the Pt precursor can be an organometallic platinum precursor, such as trimethyl(methylcyclopentadienyl)platinum(IV) or platinum(II) acetylacetonate. As before, the second step is the purging of excess vapors that cannot react, as well as the vapor products of the surface reaction. The purging can be done by flowing an inert gas, such as $N_2$ or Ar, into the reaction chamber while simultaneously or intermittently vacuum pumping the chamber. Once purged, the third step, like the first, is exposure of a second precursor. In one example, the second precursor includes an oxygen containing compound, such as $O_2$, $O_3$, or $O_2$ plasma. This second precursor can react with the surface (still containing a layer of discrete trimethyl(methylcyclopentadienyl)platinum(IV) or platinum(II) acetylacetonate), but not react with the surface reaction products, thereby creating a single saturated layer of discrete metal particles, such as Pt. The fourth step, like the second, is purging excess unreacted vapor and reaction byproducts from the system. In an example, each of these four steps is performed in a temperature of from about 50° C. to about 500° C., for example from about 100° C. to about 350° C. Depending on the concentration of the discrete metal particles, these steps can be repeated as many times as necessary. In contrast to the example given, Pt and other metal ALD processes such as W, Mo, and Ru may include different precursors that do not include oxygen or have additional processing steps.

The ALD process deposits a tunable resistive coating 200 on the interior as well as the exterior of the capillary tube 100. However, it is desirable to have the tunable resistive coating 200 only on the interior surface of the capillary tube 100. Having the coating on the interior as well as the exterior of the capillary tube 100 can cause a parallel resistance path that could interfere with the overall capillary resistance. The tunable resistive coating 200 from the exterior surface of the capillary tube 100 can be removed by sandblasting process or other similar film removal processes.

Combining metal oxides, such as $Al_2O_3$, and discrete metal particles, such as Pt, using ALD processes allows for the formation of a mixed Pt—$Al_2O_3$ material to be produced with properties dependent on the amount of Pt or $Al_2O_3$ within the film. One example of this is accomplished by using supercycles of ALD consisting of subcycles of $Al_2O_3$ ALD and subcycles of Pt ALD. One supercycle contains any number of $Al_2O_3$ ALD subcycles followed by any number of Pt ALD subcycles. By varying the amounts of respective subcycles, a mixed Pt—$Al_2O_3$ material containing a wide variety of each ALD component can be produced. This mixing allows for tuning of the film properties between the two extremes of pure Pt and pure Al$_2$O$_3$ ALD. After the deposition of the mixed Pt—Al$_2$O$_3$ film, a final layer 250 having varying thicknesses may be applied by ALD. This final layer acts as a protective coating to the underlying mixed Pt—Al$_2$O$_3$ ALD layer and can be made of any available ALD process including Al$_2$O$_3$.

Figure 6:
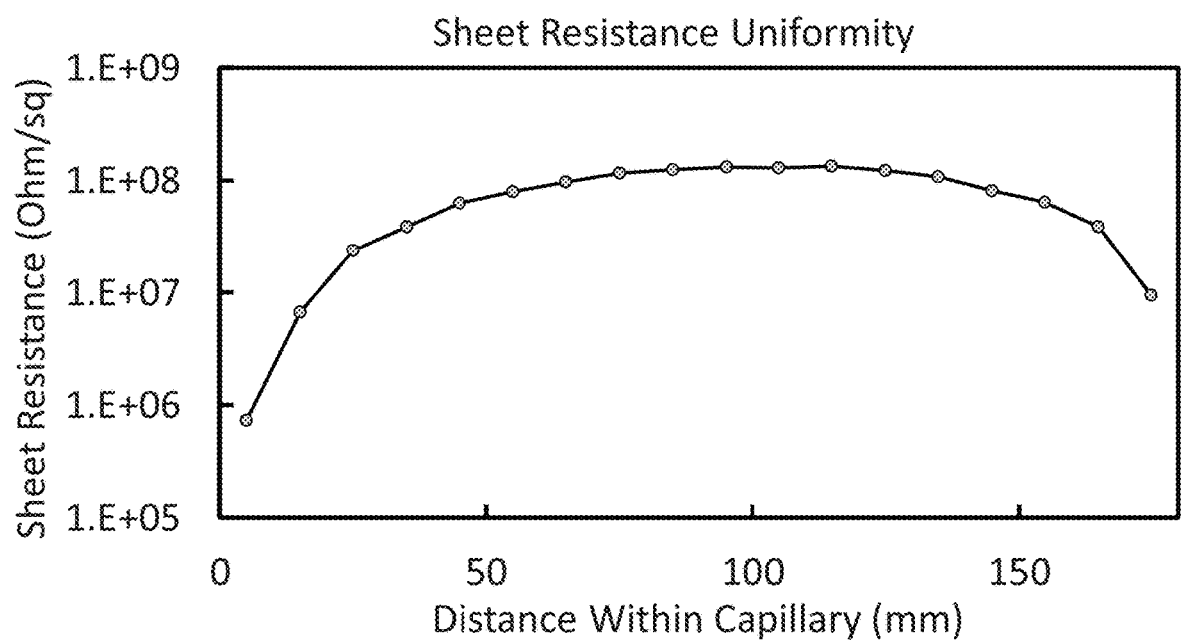
FIGS. 6 and 7 are graphs illustrating the sheet resistance uniformity of the resistive layer.

The alternating arrangement of metal oxide, such as Al$_2$O$_3$ and pure discrete metal particles, such as Pt, by ALD process creates a resistive coating on a substrate, such as capillary 100, that includes a substantially consistent sheet resistance (Rs) throughout the capillary Additionally, the ALD process can produce a resistive coating on a substrate that includes a variation of sheet resistance (Rs) throughout the capillary, for example a sheet resistance that is substantially lower near the inlet and outlet ends as shown in FIG. 6. For example, each of the plurality of inner bores can include a sheet resistance that decreases in resistance on one or both ends of the capillary tube. This nonuniform resistance can have beneficial properties for the useable lifetime of the ion transfer device. During operation, the ion transfer device end near the ion source experiences a higher temperature than the rest of the device. Over time, exposure to this higher temperature can increase the resistance towards the end. Having an initially low sheet resistance towards the ion transfer device ends, therefore, can extend the useable lifetime.

A coated capillary tube, including a body elongated along an axis from an inlet end to an outlet end; a resistive coating on an inside surface of the body; wherein the resistive coating includes at least one layer including metal oxides, metal nitrides, or a combination thereof, and discrete metal particles embedded in the at least one layer; and wherein a sheet resistance of the resistive coating is lower at the inlet end, the outlet end, or both relative to a middle portion of the body.

Additionally, varying the amount of discrete metal particles (e.g., Pt) and the metal oxide (e.g., Al$_2$O$_3$) allows for the tuning of the sheet resistance of the film. Table 1 shows how different ratios of Pt and Al results in different Rs and temperature coefficients of resistance (TCR) of the film as deposited on quartz glass slides.

TABLE 1

Effect of Using Different Pt and Al Ratio

| Sample | Pt/Al % | Rs (MΩ/Sq) | TCR (%/° C.) |
|---|---|---|---|
| 1 | 12.6 | 1.59 | −0.70 |
| 2 | 9.6 | 12.4 | −1.0 |
| 3 | 9.1 | 26.5 | −1.2 |
| 4 | 8.3 | 80 | −1.4 |

Figure 7:
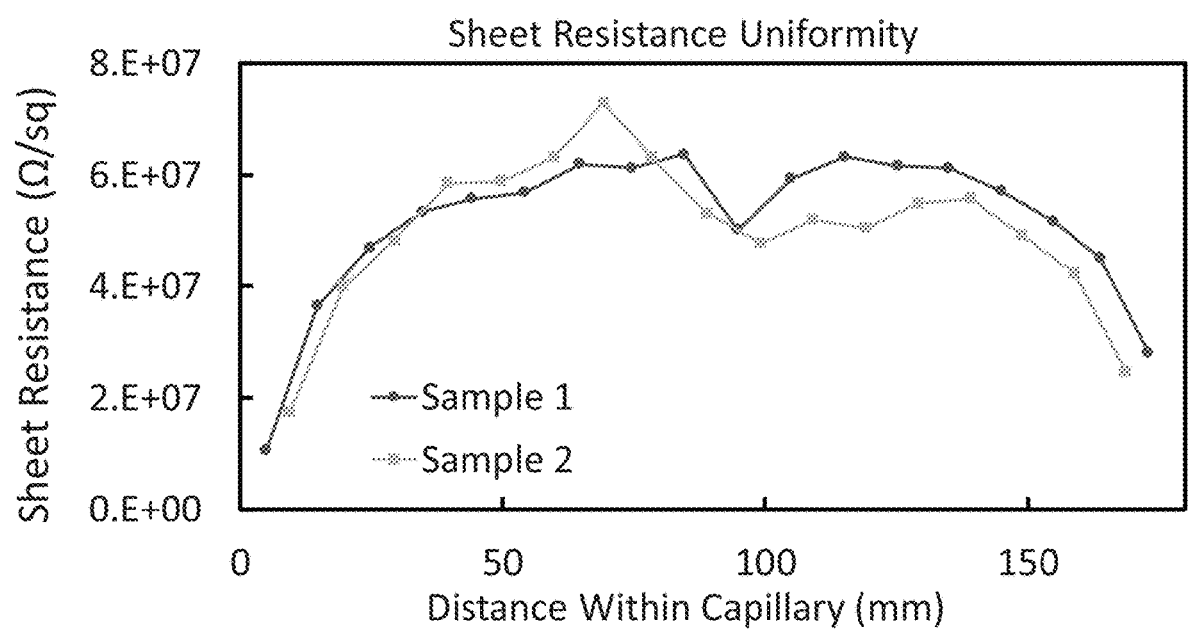

Although Table 1 illustrated TCR of from about −0.70 to about −1.4, the TCR can include a range of from about −10%/° C. to about 10%/° C., from about −5%/° C. to about 5%/° C., from about −2%/° C. to about 2%/° C., or from about −2%/° C. to about −1%/° C. In particular, the resistive coating can include a total temperature coefficient of resistance of from about −2%/° C. to about −1%/° C. As shown in FIGS. 6 and 7, there are drops in resistance towards the ends of the capillaries. These drops in resistance are due to the deposition process. Because the film is deposited into the small bore by a vapor diffusion limited process, the ends of the bores are the first to be exposed to the vapor and therefore experience longer exposures than the middle section. Although excessive exposure times should not alter a true ALD film growth process, non-idealities in the ALD growth mechanism result in some excess metal particulates being deposited towards the bore ends, lowering the resistance at those ends.

The percent Pt/Al was measured using energy-dispersive X-ray spectroscopy. Decreasing the amount of Pt/Al within the film gives higher sheet resistance and a higher absolute TCR.

EXAMPLES

To test the ability of the Pt—Al$_2$O$_3$ ALD film to coat the inside of a glass capillary, a 180 mm long borosilicate tube with an inner diameter (ID) of 0.6 mm (aspect ratio=150) was used as a substrate material. After Pt—Al$_2$O$_3$ ALD, the capillary was sectioned into 10 mm segments and the sheet resistance inside of each segment was tested, as shown in FIG. 7. The entrances of the capillaries consistently have lower sheet resistances than the rest of the capillary due to the specific properties of the Pt—Al$_2$O$_3$ ALD process. However, most of the capillary exhibits good uniformity throughout. The calculated relative standard deviations are 24% for the full capillary and 15% when the two end sections are not included. This successful deposition of the Pt—Al$_2$O$_3$ ALD within a borosilicate glass tube demonstrates the ability of the film to be used for LC/MS capillary devices which generally require a sheet resistance in the range of 107-108 Ohm/sq for proper device performance. However, the capillary tube resistance, e.g., the resistive coating, can include a total end-to-end resistance from about 100 MOhm to about 50 GOhm, such as from about 500 MOhm to about 10 GOhm. Additionally, TCR requirements for the LC/MS capillary are estimated to be less (absolutely) than −2%/° C., which is demonstrated with the Pt—Al$_2$O$_3$ ALD coating.

The capillary tube wherein each of the plurality of inner bores includes a resistance profile that decreases in resistance on one or both ends of the capillary tube. The capillary tube wherein the oxides or nitrides of a metal include TiO$_2$, Y$_2$O$_3$, Ta$_2$O$_5$, HfO$_2$, Al$_2$O$_3$, ZrO$_2$, AlN, ZrN, or a combination thereof.

Disclosed herein is a resistive coating on an inner surface of a capillary tube comprising: a base layer comprising TiO$_2$, Y$_2$O$_3$, Ta$_2$O$_5$, HfO$_2$, Al$_2$O$_3$, ZrO$_2$, AlN, ZrN, or a combination thereof; a plurality of discrete metal particles layer comprising Ru, W, Mo, Pt, or a combination thereof; a plurality of covering layer comprising TiO$_2$, Y$_2$O$_3$, Ta$_2$O$_5$, HfO$_2$, Al$_2$O$_3$, ZrO$_2$, AlN, ZrN, or a combination thereof, wherein the plurality of discrete metal particles layer and the plurality of covering layers are alternatingly arranged to create a mixture of discrete metal particles embedded in the covering layer.

The resistive coating, wherein when one of the plurality of covering layers is a final layer, the final layer includes a thickness greater than a diameter of the plurality of discrete metal particles in each of the plurality of discrete metal particles layer.

The resistive coating, wherein the plurality of covering layers has a thickness that is less than or equal to a diameter of the plurality of discrete metal particles in each of the plurality of discrete metal particles layer.

The resistive coating, wherein the base layer comprises a plurality of sublayers; wherein each of the plurality of discrete metal particles layers comprises a plurality of sublayers; and wherein each of the plurality of covering layers comprises a plurality of sublayers.

A method of coating an inside surface of a capillary tube in an ion transfer device, comprising steps of: (a) performing ALD of metal oxides or metals onto or within the capillary tube comprising: (A) introducing one or both of aluminum or zirconium or other organometallic precursors followed by purging with an inert gas; (B) pulsing a first oxygen-containing compound to react with the aluminum or the zirconium or the organometallic precursors, followed by purging with an inert gas, to create a metal oxide layer; (C) optionally conducting a first number of sub-cycles of deposition of the metal oxide layer to produce a plurality of metal oxide layers; (D) introducing a ruthenium, tungsten, molybdenum, or platinum containing precursor or a combination thereof, followed by purging with an inert gas; (E) pulsing a second oxygen-containing compound followed by purging with an inert gas, thereby performing ALD deposition of a second layer at the same or second deposition temperature; (F) optionally conducting a second number of sub-cycles of deposition of the second layer to produce one of a second plurality of layers; and (G) repeating step (A) through (F) for a plurality of cycles to produce a resistive coating on the tube; and (b) removing the coating from an outside surface of the capillary tube.

The method, further comprises annealing the capillary tube including the resistive coating at a predetermined temperature.

The method, further comprises an oxidation step or a plasma treatment step of the capillary tube including the resistive coating.

The method, wherein the aluminum precursor is an organometallic aluminum precursor comprising trimethylaluminum, aluminum trichloride, aluminum tri(2,2,6,6-tetramethyl-3,5-heptanedionate), triisobutylaluminum, or tri(dimethylamido)aluminum(III) and wherein the platinum precursor is an organometallic platinum precursor comprising trimethyl(methylcyclopentadienyl)platinum(IV) or platinum(II) acetylacetone.

The method, wherein the first oxygen-containing compound reacts with the aluminum or the zirconium precursors at a temperature of from about 30° C. to about 350° C. and wherein the second oxygen-containing is introduced at a temperature of from about 100° C. to about 350° C.

The method, wherein the first and second number of sub-cycles are the same or different.

A method of transferring ions using a coated capillary tube comprising: connecting an inlet of the coated capillary tube to an ion source at atmospheric pressure; and connecting an outlet of the coated capillary tube to a vacuum region of a mass spectrometer, wherein the coated capillary tube comprises at least one layer comprising oxides or nitrides of a metal and discrete metal particles of a different metal embedded therein.

Also disclosed herein is a method of transferring ions using a coated capillary tube comprising: connecting an inlet of the coated capillary tube to an ion source at atmospheric pressure; and connecting an outlet of the coated capillary tube to a vacuum region of a mass spectrometer, wherein the coated capillary tube comprises at least one layer comprising oxides or nitrides of a metal and discrete metal particles of a different metal embedded therein.

Also disclosed herein is a coated capillary tube, comprising: a body elongated along an axis from an inlet end to an outlet end; a resistive coating on an inside surface of the body; wherein the resistive coating includes at least one layer including metal oxides, metal nitrides, or a combination thereof, and discrete metal particles embedded in the at least one layer; and wherein a sheet resistance of the resistive coating is lower at the inlet end, the outlet end, or both relative to a middle portion of the body.

This disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompasses in its disclosure and teaches equivalents, means, systems and methods for practicing the many aspects, mechanisms and devices disclosed herein. Additionally, this disclosure is intended to encompass the equivalents, means, systems, and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A coated capillary tube having a tunable resistance coating in an ion transfer device, comprising:
   an inlet end in communication with an atmospheric-pressure ion source;
   an outlet end in communication with a vacuum region of a mass spectrometer;
   a body elongated along an axis from the inlet end to the outlet end;
   an inside surface defining a bore having an inner diameter; and
   a resistive coating on the inside surface of the capillary tube, the resistive coating comprising:
   at least one layer of a metal comprising metal oxides or metal nitrides, and discrete metal particles of a different metal embedded in the at least one layer of the metal.

2. The capillary tube of claim 1, wherein the metal oxides include a metal oxide of Al2O3, TiO2, Y2O3, Ta2O5, HfO2, ZrO2, SiO2 or a combination thereof.

3. The capillary tube of claim 1, wherein the resistive coating further comprises a metal or metal oxide of Pt, Ru, W, Mo, or a combination thereof.

4. The capillary tube of claim 1, wherein the resistive coating includes a total end-to-end resistance of from about 100 MOhm to about 50 GOhm.

5. The capillary tube of claim 1, wherein the resistive coating includes a total temperature coefficient of resistance of from about −2%/° C. to about −1%/° C.

6. The capillary tube of claim 1, wherein a length of the capillary tube is from about 75 mm to about 200 mm; an outer diameter of the capillary tube is from about 5 mm to about 10 mm; and an inner diameter of the capillary tube is from about 0.1 mm to about 2.0 mm.

7. The capillary tube of claim 1, wherein the bore includes a sheet resistance that decreases in resistance on one or both ends of the capillary tube.

8. The capillary tube of claim 1, wherein the resistive coating further comprises a base layer, a final layer, or both.

9. The capillary tube of claim 8, wherein the final layer includes a thickness that is greater than a diameter of the discrete metal particles.

10. The capillary tube of claim 8, wherein the base layer includes a thickness that is greater than a diameter of the discrete metal particles.

11. The capillary tube of claim 8, wherein the base layer, the final layer, or both comprise oxides or nitrides of a metal.

12. The capillary tube of claim 8, wherein the base layer comprises a plurality of sublayers of metal oxides, metal nitrides, or a combination thereof;
   wherein the at least one layer including discrete metal particles comprises a plurality of sublayers including a plurality of discrete metal particles; and
   wherein the final layer comprises a plurality of sublayers of metal oxides, metal nitrides, or a combination thereof.

13. The capillary tube of claim 1, wherein the at least one layer comprises a plurality of alternating layers including a plurality of layers including discrete metal particles and a plurality of layers including oxides or nitrides of the metal.

14. The capillary tube of claim 1, wherein the at least one layer includes a thickness of from about 1 nm to about 800 nm; and wherein the resistive coating includes a thickness of from about 0.5 nm to about 1 μm.

15. A resistive coating on a capillary tube, the resistive coating comprising:
   a base layer comprising $SiO_2$, $TiO_2$, $Y_2O_3$, $Ta_2O_5$, $HfO_2$, $Al_2O_3$, $ZrO_2$, AlN, ZrN, or a combination thereof, wherein the capillary tube includes an inlet end in communication with an atmospheric-pressure ion source, an outlet end in communication with a vacuum region of a mass spectrometer, and a body elongated along an axis from the inlet end to the outlet end and having an inside surface defining a tube bore, and wherein the base layer is disposed on the inside surface;
   a plurality of discrete metal or metal oxide particles layers comprising Ru, W, Mo, Pt, or a combination thereof; and
   a plurality of covering layers comprising $SiO_2$, $TiO_2$, $Y_2O_3$, $Ta_2O_5$, $HfO_2$, $Al_2O_3$, $ZrO_2$, AlN, ZrN, or a combination thereof,
   wherein the plurality of discrete metal or metal oxide particles layers and the plurality of covering layers are alternatingly arranged to create a mixture of discrete metal particles embedded in the plurality of covering layers.

16. The resistive coating of claim 15, wherein one of the plurality of covering layers is a final layer, and the final layer includes a thickness greater than a diameter of the discrete metal or metal oxide particles in each of the plurality of discrete metal particles layers.

17. The resistive coating of claim 15, wherein the plurality of covering layers has a thickness that is less than or equal to a diameter of the discrete metal particles in each of the plurality of discrete metal or metal oxide particles layers.

18. The resistive coating of claim 15, wherein the base layer comprises a plurality of sublayers, and
   wherein each of the plurality of covering layers comprises a plurality of sublayers.

19. A coated capillary tube having a tunable resistance coating in an ion transfer device, comprising:
   an inlet end in communication with an atmospheric-pressure ion source;
   an outlet end in communication with a vacuum region of a mass spectrometer;
   a body elongated along an axis from the inlet end to the outlet end;
   an inside surface defining a bore having an inner diameter; and
   a resistive coating on the inside surface of the capillary tube, the resistive coating comprising:
      a base layer comprising $SiO_2$, $TiO_2$, $Y_2O_3$, $Ta_2O_5$, $HfO_2$, $Al_2O_3$, $ZrO_2$, AlN, ZrN, or a combination thereof;
      a plurality of discrete metal particles layers, each discrete metal particles layer comprising Ru, W, Mo, Pt, or a combination thereof; and
      a plurality of covering layers, each covering layer comprising $SiO_2$, $TiO_2$, $Y_2O_3$, $Ta_2O_5$, $HfO_2$, $Al_2O_3$, $ZrO_2$, AlN, ZrN, or a combination thereof,
      wherein the plurality of discrete metal particles layers and the plurality of covering layers are alternatingly arranged to create a mixture of discrete metal particles embedded in the plurality of covering layers.

20. The coated capillary tube of claim 19, wherein the base layer comprises a plurality of sublayers, and
   wherein each of the plurality of covering layers comprises a plurality of sublayers.

* * * * *